United States Patent
Liang

(10) Patent No.: US 10,638,721 B2
(45) Date of Patent: May 5, 2020

(54) PET CAGE DOOR

(71) Applicant: Hongkun Liang, Zhong shan (CN)

(72) Inventor: Hongkun Liang, Zhong shan (CN)

( * ) Notice: Subject to any disclaimer, the term of this patent is extended or adjusted under 35 U.S.C. 154(b) by 329 days.

(21) Appl. No.: 15/843,525

(22) Filed: Dec. 15, 2017

(65) Prior Publication Data
US 2019/0021276 A1    Jan. 24, 2019

(30) Foreign Application Priority Data

Jul. 21, 2017  (CN) .................... 2017 2 0898169 U

(51) Int. Cl.
| | | |
|---|---|---|
| *A01K 1/03* | (2006.01) | |
| *E05C 9/00* | (2006.01) | |
| *E05C 9/04* | (2006.01) | |

(52) U.S. Cl.
CPC ................ *A01K 1/03* (2013.01); *E05C 9/006* (2013.01); *E05C 9/008* (2013.01); *E05C 9/04* (2013.01)

(58) Field of Classification Search
CPC ........ A01K 1/03; A01K 1/0017; A01K 1/034; A01K 1/033; A01K 1/0236; A01K 1/0245; E05C 9/008; E05C 9/006; E05C 9/04; E05C 9/042
See application file for complete search history.

(56) References Cited

U.S. PATENT DOCUMENTS

| | | | | |
|---|---|---|---|---|
| 5,016,926 A | * | 5/1991 | Sharp ........................ | E05C 1/04 292/42 |
| 5,071,176 A | * | 12/1991 | Smith ....................... | E05C 9/06 292/42 |
| 6,182,611 B1 | * | 2/2001 | Marchioro ........... | A01K 1/0245 119/453 |
| 6,571,740 B1 | * | 6/2003 | Kinder ................. | A01K 1/0245 119/416 |
| 6,647,925 B1 | * | 11/2003 | Waiters ................ | A01K 1/0245 119/453 |
| 6,783,162 B1 | * | 8/2004 | Harper ................. | A01K 1/0245 292/336.3 |
| 2010/0192870 A1 | * | 8/2010 | Wood ................... | A01K 1/0245 119/496 |
| 2011/0041774 A1 | * | 2/2011 | Northrop ............. | A01K 1/0245 119/497 |
| 2013/0233250 A1 | * | 9/2013 | Veness ................... | A01K 1/034 119/496 |
| 2014/0150728 A1 | * | 6/2014 | Tamiozzo ............ | A01K 1/0236 119/501 |
| 2015/0144070 A1 | * | 5/2015 | Qiu ........................ | E05B 63/14 119/496 |

\* cited by examiner

*Primary Examiner* — Trinh T Nguyen
(74) *Attorney, Agent, or Firm* — Oliff PLC

(57) ABSTRACT

The present invention discloses a novel pet cage door, including a door frame and a switch door capable of rotating relative to the door frame so as to be opened and closed. A locking apparatus is disposed between the switch door and the door frame, and the locking apparatus includes a housing disposed on the switch door. The present invention has a simple structure and requires low costs.

6 Claims, 4 Drawing Sheets

PET CAGE DOOR

BACKGROUND

Technical Field

The present invention relates to a novel pet cage door.

Related Art

In today's social life, many people feed animals as pets. Therefore, pet cages are certainly indispensable. Especially, many users take long journeys by plane by taking pets in pet cages. However, a cage door of a conventional pet cage has the following disadvantages: a locking apparatus between a switch door and a door frame of a conventional pet cage door has a complex structure with a large number of parts and components and requires many assembly procedures, leading to low production efficiency and high production costs.

Therefore, the present invention is invented in view of the foregoing disadvantages.

SUMMARY

An objective of the present invention is to overcome disadvantages of the prior art and provide a novel pet cage door having a simple structure and requiring low costs.

The present invention is implemented by using the following technical solutions:

Compared with the prior art, the present invention has the following advantages:

The present invention has a simple structure with a small number of parts and components and requires low costs. It is easy and convenient to assemble and manufacture the pet cage door.

DETAILED DESCRIPTION

Figure 1:
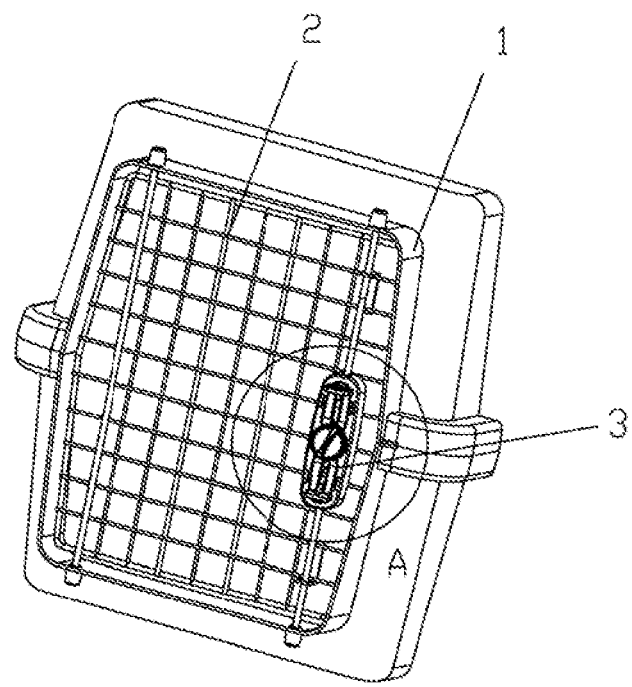
FIG. 1 is a three-dimensional view of the present invention.

The present invention is further described below with reference to the accompanying drawings:

As shown in FIG. 1 to FIG. 4, a novel pet cage door includes a door frame 1 and a switch door 2 capable of rotating relative to the door frame 1 so as to be opened and closed. A locking apparatus 3 is disposed between the switch door 2 and the door frame 1. The locking apparatus 3 includes a housing 31 disposed on the switch door 2, the housing 31 is internally provided with a vertical lock bar 32 capable of vertically moving so as to be inserted into a vertical socket on the door frame 1, and the vertical lock bar 32 is provided with a raised portion 33 raised from a side wall of the vertical lock bar 32. The housing 31 is further internally provided with a lock bar retaining member 34 capable of rotating relative to the housing 31, and the lock bar retaining member 34 includes a rotation portion 341 and a retaining portion 342 raised on the rotation portion 341. Before the rotation portion 341 rotates, the retaining portion 342 abuts against the raised portion 33 to prevent the vertical lock bar 32 from vertically moving, and after the rotation portion 341 rotates, the retaining portion 342 is separated from the raised portion 33 to reserve a space for vertical movement of the vertical lock bar 32. Before the rotation portion 341 rotates, the retaining portion 342 on the rotation portion 341 abuts against the raised portion 33 on the vertical lock bar 32 to prevent the vertical lock bar 32 from vertically moving, so that the vertical lock bar 32 keeps being inserted into the vertical socket on the door frame 1, and the pet cage door is kept locked. When the pet cage door needs to be opened, the retaining portion 342 on the rotation portion 341 no longer abuts against the raised portion 33 on the vertical lock bar 32 after rotating by an angle along with the pet cage door, so as to reserve a space for vertical movement of the vertical lock bar 32. In this case, the locking apparatus 3 can be unlocked by making the vertical lock bar 32 vertically move, so as to open the pet cage door. The entire pet cage door has a simple structure with a small number of parts and components and requires low costs. It is easy and convenient to assemble and manufacture the pet cage door.

Figure 3:
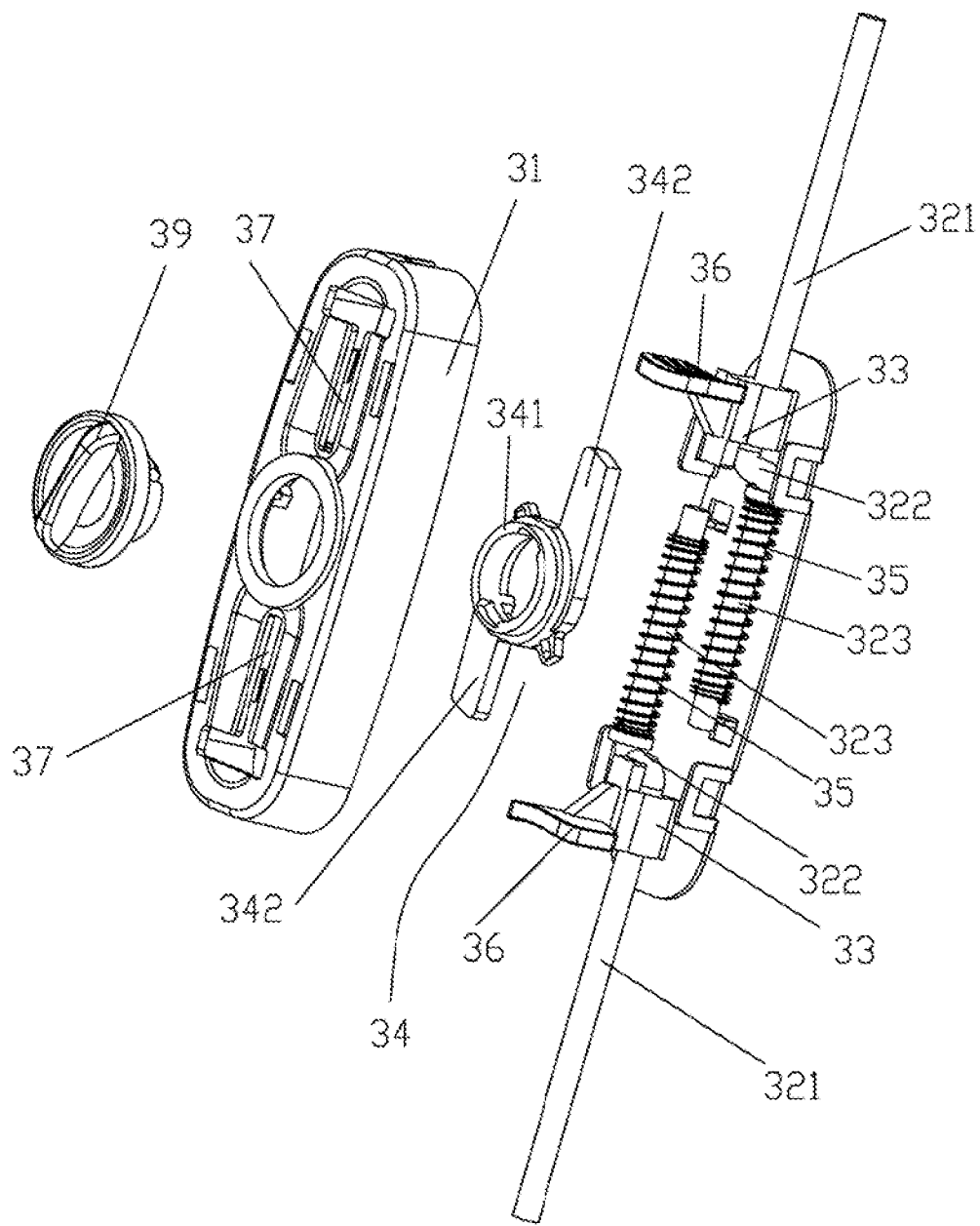
FIG. 3 is an exploded view of the present invention.
Figure 4:
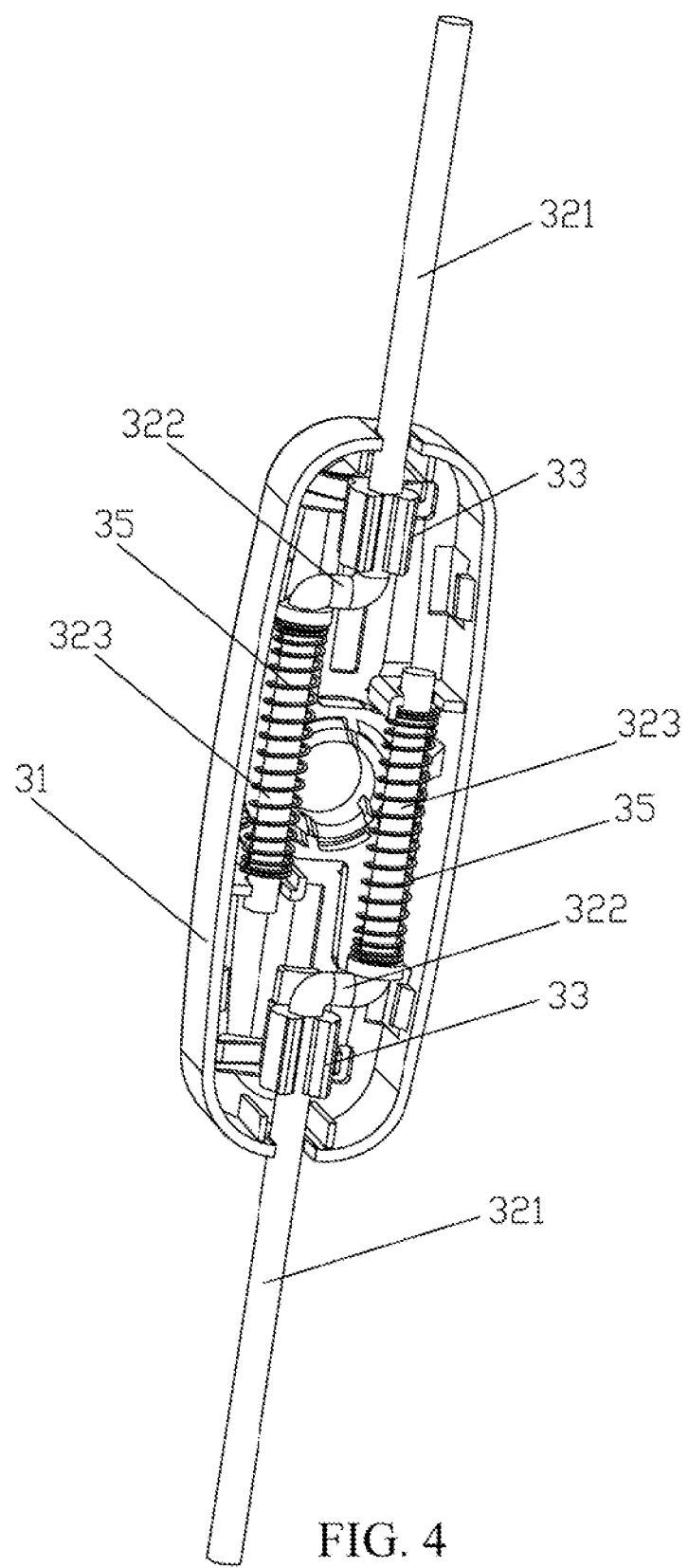
FIG. 4 is a three-dimensional view of components according to the present invention.

As shown in FIG. 3 and FIG. 4, the vertical lock bar 32 includes a first vertical bar segment 321 matching the vertical socket on the door frame 1, a lower portion of the first vertical bar segment 321 is transversely bent to form a cross bar segment 322, and the cross bar segment 322 is vertically bent to form a second vertical bar segment 323. The housing 31 is further internally provided with a reset spring 35 sleeved on the second vertical bar segment 323 and used for resetting the vertical lock bar 32. Such a design makes the structure of the locking apparatus 3 very compact. In addition, when the pet cage door is locked, the reset spring 35 makes the vertical lock bar 32 inserted into the vertical socket on the door frame 1. In this case, even if the rotation portion 341 rotates, the reset spring 35 still applies a pushing force to the vertical lock bar 32 to keep the insertion, so that the pet cage door is firmly locked. When the pet cage door needs to be opened, first the rotation portion 341 is rotated, and then the vertical lock bar 32 is pushed to overcome an elastic force of the reset spring 35. Therefore, two actions are needed to unlock the pet cage door, thereby preventing the pet cage door from being unlocked due to a misoperation of the rotation portion 341, ensuring that the pet cage is firmly locked, and preventing a pet from escaping.

As shown in FIG. 3 and FIG. 4, the raised portion 33 is further provided with a toggle handle 36 integrated with the raised portion 33 and exposed from the housing 31, and the housing 31 is provided with a sliding slot 37 for the toggle handle 36 to vertically slide. After the rotation portion 341 is rotated, the toggle handle 36 may be pushed to make the vertical lock bar 32 vertically move, thereby making it more convenient and fast to unlock the pet cage door.

As shown in FIG. 3 and FIG. 4, there are two vertical lock bars 32, and the two vertical lock bars 32 respectively match vertical sockets on an upper board and a lower board of the door frame 1. There are two raised portions 33, and the two raised portions 33 are respectively disposed on the corresponding vertical lock bars 32. Two retaining portions 342 are arranged on the rotation portion 341 along a circumference, and when the rotation portion 341 rotates, the two retaining portions 342 both abut against or are separated from the raised portions 33. Therefore, when the pet cage door is locked, the two vertical lock bars 32 lock an upper side and a lower side of the pet cage, ensuring that the pet cage is firmly locked. In addition, as long as the rotation portion 341 rotates by an angle, the retaining portions 342 both can abut against or be separated from the raised portions 33. Such a design is skillful, making it convenient and fast to unlock the pet cage door.

Figure 5:
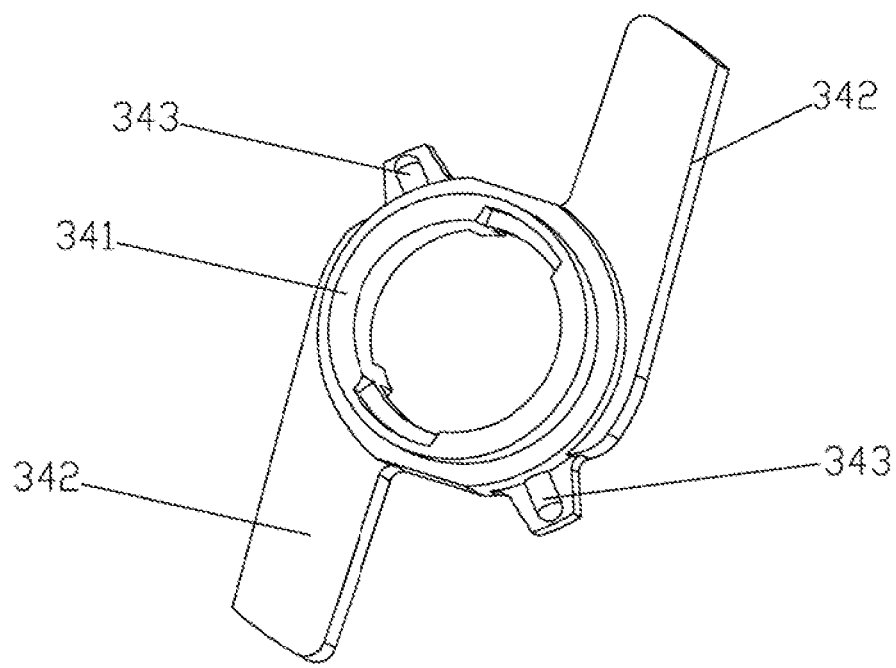
FIG. 5 is a first three-dimensional view of parts according to the present invention.
Figure 6:
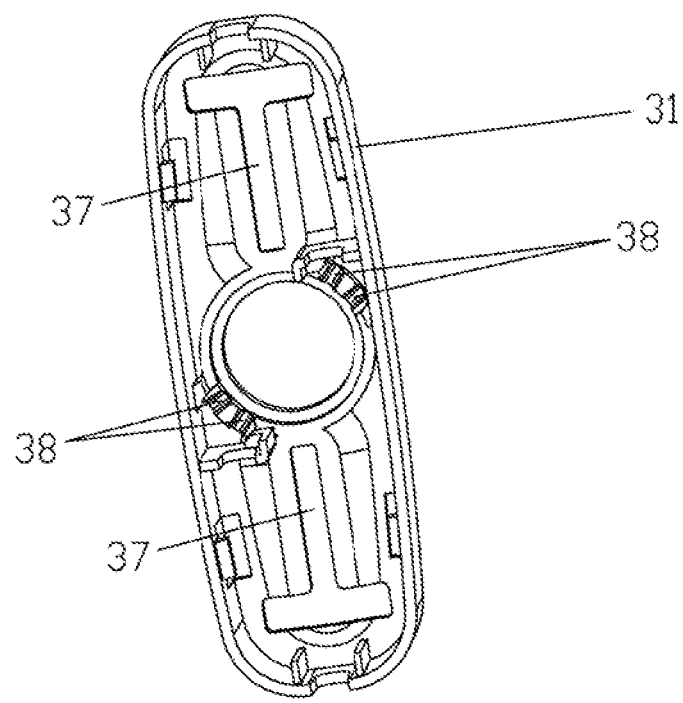
FIG. 6 is a second three-dimensional view of parts according to the present invention.

As shown in FIG. 5 and FIG. 6, an arc-shaped protrusion 343 whose surface is arc-shaped is disposed on the rotation portion 341, and a plurality of clamping slots 38 capable of matching the arc-shaped protrusion 343 to position the rotation portion 341 is disposed on an inner side wall of the housing 31. After the rotation portion 341 rotates, the arc-shaped protrusion 343 is engaged with the clamping slot 38, so that the rotation portion 341 is positioned. In this case, a hand is released to push the vertical lock bar 32 to vertically move, so as to complete unlocking. When the pet cage door is closed, the vertical lock bar 32 is pushed by using the toggle handle 36 to overcome an elastic force of the reset spring 35. When the vertical lock bar 32 is aligned with the vertical socket on the door frame 1, the vertical lock bar 32 is released, and the reset spring 35 makes the vertical lock bar 32 reset and inserted into the vertical socket on the door frame 1. Then, the rotation portion 341 is rotated, and the retaining portion 342 on the rotation portion 341 moves to a position capable of abutting against the raised portion 33 again, so that the pet cage door is firmly locked.

Figure 2:
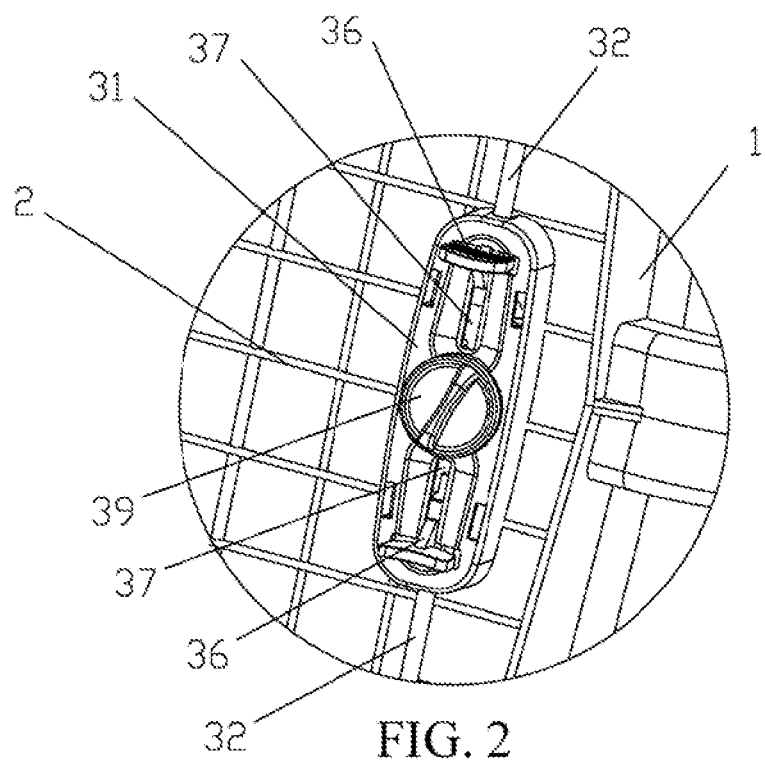
FIG. 2 is an enlarged view of A in FIG. 1.

As shown in FIG. 2 and FIG. 3, a knob 39 exposed from the housing 31 is connected to the rotation portion 341. A user may drive, by using the knob 39, the rotation portion 341 to rotate. This is very easy and convenient to operate. Certainly, alternatively, the user may drive, by using a motor in the housing 31, the rotation portion 341 to rotate, as long as an exposed trigger switch capable of controlling the motor to rotate is disposed on the housing 31.

What is claimed is:

1. A pet cage door, comprising a door frame (1) and a switch door (2) capable of rotating relative to the door frame (1) so as to be opened and closed, wherein a locking apparatus (3) is disposed between the switch door (2) and the door frame (1), the locking apparatus (3) comprises a housing (31) disposed on the switch door (2), and the housing (31) is internally provided with a vertical lock bar (32) capable of vertically moving so as to be inserted into a vertical socket on the door frame (1); the vertical lock bar (32) is provided with a raised portion (33) raised from a side wall of the vertical lock bar (32); the housing (31) is further internally provided with a lock bar retaining member (34) capable of rotating relative to the housing (31), and the lock bar retaining member (34) comprises a rotation portion (341) and a retaining portion (342) raised on the rotation portion (341); before the rotation portion (341) rotates, the retaining portion (342) abuts against the raised portion (33) to prevent the vertical lock bar (32) from vertically moving; and after the rotation portion (341) rotates, the retaining portion (342) is separated from the raised portion (33) to reserve a space for vertical movement of the vertical lock bar (32).

2. The pet cage door according to claim 1, wherein the vertical lock bar (32) comprises a first vertical bar segment (321) matching the vertical socket on the door frame (1), a lower portion of the first vertical bar segment (321) is transversely bent to form a cross bar segment (322), the cross bar segment (322) is vertically bent to form a second vertical bar segment (323), and the housing (31) is further internally provided with a reset spring (35) sleeved on the second vertical bar segment (323) and used for resetting the vertical lock bar (32).

3. The pet cage door according to claim 2, wherein the raised portion (33) is further provided with a toggle handle (36) integrated with the raised portion (33) and exposed from the housing (31), and the housing (31) is provided with a sliding slot (37) for the toggle handle (36) to vertically slide.

4. The pet cage door according to claim 3, wherein there are two vertical lock bars (32), and the two vertical lock bars (32) respectively match vertical sockets on an upper board and a lower board of the door frame (1); there are two raised portions (33), and the two raised portions (33) are respectively disposed on the corresponding vertical lock bars (32); and two retaining portions (342) are arranged on the rotation portion (341) along a circumference, and when the rotation portion (341) rotates, the two retaining portions (342) both abut against or are separated from the raised portions (33).

5. The pet cage door according to claim 4, wherein an arc-shaped protrusion (343) whose surface is arc-shaped is disposed on the rotation portion (341), and a plurality of clamping slots (38) capable of matching the arc-shaped protrusion (343) so as to position the rotation portion (341) is disposed on an inner side wall of the housing (31).

6. The pet cage door according to claim 4, wherein a knob (39) exposed from the housing (31) is connected to the rotation portion (341).

* * * * *